United States Patent [19]

Gardzielia et al.

[11] Patent Number: 5,382,608
[45] Date of Patent: Jan. 17, 1995

[54] BINDER MIXTURES CONTAINING REACTIVE GROUP CONTAINING LIGNIN AND NOVOLAKS

[75] Inventors: Arno Gardzielia, Witten-Rüdinghause, Germany; Ken Kurple, Casco, Mich.; Achim Hansen; Stephan Schroter, both of Iserlohn, Germany; Willi Roll, Altenberge, Germany

[73] Assignee: Rutgerswerke Aktiengesellschaft, Germany

[21] Appl. No.: 286,786

[22] Filed: Aug. 5, 1994

Related U.S. Application Data

[62] Division of Ser. No. 162,441, Dec. 3, 1993.

[30] Foreign Application Priority Data

Dec. 10, 1992 [DE] Germany .......................... 4241513

[51] Int. Cl.⁶ .............................................. C08L 1/02
[52] U.S. Cl. ........................................ 524/14; 524/594; 525/489; 527/403
[58] Field of Search .................. 524/14, 594; 525/489; 527/403

[56] References Cited

U.S. PATENT DOCUMENTS

| | | | |
|---|---|---|---|
| 4,265,809 | 5/1981 | Holsopple et al. | 260/124 R |
| 4,320,036 | 3/1982 | Gobran et al. | 524/14 |
| 4,745,024 | 5/1988 | Jellinek et al. | 428/198.7 |
| 5,260,405 | 11/1993 | Gardziella et al. | 528/129 |
| 5,300,593 | 4/1994 | Gardziella et al. | 525/489 |

Primary Examiner—John Kight, III
Assistant Examiner—Richard Jones
Attorney, Agent, or Firm—Bierman and Muserlian

[57] ABSTRACT

A binder mixture containing lignin or lignins with reactive groups and phenol-novolac in a weight ratio of 95:5 to 50:50 useful for the production of non-woven fabrics and wood fiber materials.

5 Claims, No Drawings

BINDER MIXTURES CONTAINING REACTIVE GROUP CONTAINING LIGNIN AND NOVOLAKS

This application is a division of U.S. patent application Ser. No. 162,441 filed Dec. 3, 1993.

STATE OF THE ART

The production of nonwoven fabrics uses as binder phenolic resins in powder form which permit a simple manufacturing process. The nonwoven fabrics obtained have the unpleasant property that occasionally, especially after action at elevated temperatures and moisture, they emit aminic decomposition products and formaldehyde. The odor deriving from the binder can be avoided by using as the binder a mixture in powder form consisting of non-thermoreactive phenolic resins and one or more thermoreactive condensation products from the group of the phenol, amino, or epoxy resins as taught in U.S. Pat. No. 4,745,024.

Yet there remains a residual odor stemming from the use of fiber material obtained from textile waste. These fibers often contain as a brightener, urea-formaldehyde condensation products, which under the above-mentioned conditions may emit volatile substances. Besides, the strength and torsion rigidity values of textile structures produced with these binders are lower than those produced with pure phenolic resin.

OBJECTS OF THE INVENTION

It is an object of the invention to make available a binder or binder mixture which is suitable for the production of nonwoven fabrics by the usual methods, which facilitates the strength and rigidity values of the fabric known from the use of phenolic resin for all fiber materials and which after curing does not release odor-forming gases, and which reduces the release of odor-forming gases, particularly formaldehyde, from brighteners.

It is another object of the invention to provide improved nonwoven fabrics and wood fiber materials.

These and other objects and advantages of the invention will become obvious from the following detailed description.

THE INVENTION

The novel binder mixtures of the invention are a mixture of lignin or lignins with reactive groups and phenol-novolac in a weight ratio of 95:5 to 50:50.

The binder mixtures are suitable in particular for the production of nonwoven fabrics, but also of wood fiber materials. It has been found that under thermal treatment of fibers from textile wastes with lignin containing reactive groups, the fibers are bonded together and at the same time odor-forming substances, particularly formaldehyde, are bound. Hence, lignin containing reactive groups could be used as a binder for the production of nonwoven fabrics if the strengths obtained would be sufficient.

It has been found further that a mixture of lignin containing reactive groups and a phenol novolac can be cured thermally. If such a mixture is used as a binder for textile fibers, it is possible to continue using the common production technology unchanged, and to obtain sufficient strength and rigidity values of the fabric as they are known from the sole use of phenolic resin. Moreover, the odor and formaldehyde-binding properties are preserved.

The binder mixtures of the invention contain lignin or lignins which contains/contain the reaction groups and a phenol novolac in the weight ratio of 95:5 to 50:50, preferably in the weight ratio of 92.5:7.5 to 75:25.

Lignins with reactive groups are particularly those containing non-phenolic hydroxyl groups, carboxyl, isocyanate, or epoxide groups, and theoretically the presence of two reactive groups per molecule unit of the lignin would be sufficient. However, for reasons of reaction reliability, reaction speed and crosslinking strength, a much higher number of reactive groups is desirable so that the percentage of functional groups in the average molecular weight of the lignins is 0.5 to 7.5%. This percentage is referred to as the percent share of the functional groups.

Lignins not chemically modified have a natural content of non-phenolic OH groups, which in certain lignin types may be up to 1%. Corresponding selected lignin types can be employed in the binder mixture of the invention, but preferably lignins with non-phenolic hydroxyl groups those whose content of hydroxyalkyl groups had been adjusted correctly for instance by reaction with alkylene oxides are used. Such products are described in U.S. Pat. No. 4,918,167.

Chemically unmodified lignin contains also a small proportion of carboxyl groups which depends on the type or fraction of the lignin as well as on the production process. Thus, for example, lignin from the Kraft process has a carboxyl index up to 20 and lignin from the organosolv process has a carboxyl index up to 60. To increase the number of carboxyl groups further, lignin may be treated either with oxidants, particularly ozone, reacted with dicarboxylic acid anhydride, epoxy-succinate, or chloroacetic acid. Corresponding literature references are found in Encyclopedia of Polymer Science and Engineering, 2nd Edition, Volume 8, pages 824–826.

Lignins containing isocyanate groups are obtained by reaction of hydroxyl groups or of lignins containing hydroxyl groups with diisocyanates as described in J. Appl. Polym. Sci., Vol. 29 (5), pages 1831–41. Lignins containing epoxide groups are described in U.S. Pat. Nos. 4,918,167 or 4,265,809. They are obtained by reaction of lignins with ethylene-unsaturated groups or hydroxypropyl groups with epichlorhydrin. Preferred are lignins with epoxide equivalents from 500 to 600.

There can be used as lignin with reactive groups both a lignin type with one reactive group as well as lignin type with several reactive groups, for instance hydroxyl and epoxide groups, and also mixtures of several lignin types of different reactive groups.

Novolacs are reaction products obtained in an acid medium prepared by condensation of a phenolic compound and an aldehyde, in particular phenol and formaldehyde. The molar phenol-formaldehyde ratio is preferably in the range of 1:0.7 to 1:0.9. The preferred novolacs are those with an extremely low content of free formaldehyde and free phenol, as known e.g. from Kunststoff-Handbuch 10- Duroplaste, 2nd edition, page 96.

Novolac and lignin are present in the form of fine powders which are mixed together in the desired weight ratio and such a mixture is the simplest form of the binder mixture of the invention. In addition, however, the binder mixture may contain accelerators such as imidazole and/or polyamines and possibly also small amounts i.e. 1 to 3% referred to novolac, of hexamethylene tetramine.

For the production of nonwoven textiles with the binder mixture of the invention, the common production technologies can be employed and aerodynamic web formation is preferred. The preopened fiber material is further broken down, seized by an air stream, transported, and deposited continuously on a perforated dandy roll to form the web. The binder mixture is then sprinkled in powder form into the web via rolls, vibratory chutes or similar proportioning devices. Intensive and homogeneous distribution of the binder mixture in the nonwoven material must be provided for by whirling in a closed system connected downstream. Subsequently, the fiber material now containing binder is brought back to the cross-section of the fiber web in a nip formed between suction rolls and is again deposited as a nonwoven.

The curing of the binder mixture and hence the final consolidation of the fiber web as a nonwoven material can also be done by various methods. Preferably, the web is moved continuously between two wire mesh belts through a long curing duct in which the curing takes place by means of hot air of 160° to 220° C. sucked or blown through the web. This method produces nonwoven materials in the form of webs and panels.

Another possibility of consolidating the nonwovens consists in curing the binder mixture by hot pressing, which is used particularly for the production of more strongly compacted panels and shapes. To this end, the nonwoven is only predried and precured in the curing duct at much lower temperatures and subsequently, the material is shaped accordingly in hot presses.

In the following examples, there are described several preferred embodiments to illustrate the invention. However, it should be understood that the invention is not intended to be limited to the specific embodiments. All data are in parts by weight and MI is 2-methylimidazole. H indicates hexamethylenetetramine.

EXAMPLE 1

800 g of lignin produced by the organosolv process and precipitated with $CO_2$ were melted at 150° C. and mixed with 200 g of Bisphenol-A epoxy resin (Rütapox® 0164, epoxide equivalent = 188, viscosity at 25° C.=9730 mPa.s). 3 g of ethyl triphenyl phosphonium bromide were added at 130° C. until the epoxide equivalent of the mixture was 1880. The mixture was then cooled to obtain a product with a melting point of 110° C. and a viscosity at 175° C. of 3020 mPa.s.

EXAMPLE 2

Using the procedure of Example 1, 200 g of an epoxidized phenol novolac (epoxide equivalent=183, viscosity at 80° C.=1560 mPa.s) were reacted until the epoxide equivalent was 1236 to obtain a product with a melting point of 119° C. and a viscosity at 175° C. of 6900 mPa.s.

EXAMPLE 3

Using the procedure of Example 1, using as epoxy resin component, 150 g of (Rütepox 0164) and 50 g of hexandiol diglycidyl ether the reaction was run until the epoxide equivalent was 1512 to obtain a product with a melting point of 92° C. and a viscosity at 175° C. of 1080 mPa.s.

EXAMPLE 4

Using the procedure of Example 1, 600 g of lignin, 400 g of epoxy resin (Rütepox 0164) and addition of 5 g of triphenyl phosphine were reacted to a final epoxide equivalent of 940. Then, 100 g of dibutyl phthalate were added to adjust the viscosity to obtain a product with a melting point of 92° C. and a viscosity of 175° C. of 984 mPa.s.

EXAMPLE 5

Using the procedure of Example 4, 400 g of lignin, 600 g of epoxy resin (Rütepox 0164) and 100 g of dibutyl phthalate were reacted to obtain a final epoxide equivalent of 627 (before addition of dibutyl phthalate). The product had a melting point of 81° C. and a viscosity at 175° C. of 286 mPa.s.

EXAMPLES 6 TO 13

The modified lignins of Examples 1 to 5 were mixed with a phenol novolac and accelerator and then ground to a fineness of 8 to 14%>90/μm. Characterization of the novolac used in all corresponding examples: Molar ratio of phenol:formaldehyde was 0.70; content of free phenol: 0.25%; flow with 10% hexamethylene tetramine: 98 mm, B time with addition of 10% hexamethylene tetramine at 150° C.: 1 min, 52 sec. The flow path according to DIN ISO 8619 and the B time at 150° C. according to DIN ISO 8987A of the binders obtained were determined. The values obtained are contained in Table 1.

TABLE 1

| Example | Mod. lignin from example | Quant. | Novolac Quant. | Accelerator | Flow path | B time |
|---|---|---|---|---|---|---|
| 6 | 1 | 70 | 30 | 1 MI | 18 mm | 1'18" |
| 7 | 2 | 70 | 30 | 1 MI | 14 mm | 1'12" |
| 8 | 3 | 90 | 10 | 1 MI | 21 mm | 2'52" |
| 9 | 3 | 70 | 30 | 1 MI | 29 mm | 1'29" |
| 10 | 3 | 50 | 50 | 1 MI | 40 mm | 0'50" |
| 11 | 4 | 70 | 30 | 1 MI | 41 mm | 1'12" |
| 12 | 5 | 70 | 30 | 2 MI | 31 mm | 0'38" |
| 13 | 3 | 70 | 30 | 2 H | 39 mm | 2'01" |

EXAMPLE 14

800 g of lignin obtained by the organosolv process were mixed with 200 g of isophorondiisocyanate and 100 g of dibutylphthalate and reacted at 85° C. with addition of 0.5 g of dibutyl tin dilaurate (DBTL) at 80° C. until the NCO content had dropped to 50% of the original content. The product was cooled and had a melting point of 104.5 ° C.

EXAMPLE 15

750 g of the modified lignin of Example 14 were ground with 250 g of phenol novolac and 2.0 g of hexamethylene tetramine to obtain a product with a Flow path: 15 mm, B time at 150° C.: 4 min 03 sec.

EXAMPLE 16

600 g of an epoxide-terminal, modified lignin produced by Example 33 of U.S. Pat. No. 4,265,809 were mixed with 600 g of phenol novolac and 10 g of MI and ground to obtain a product with a B time at 150° C.: 1 min 35 sec.

EXAMPLE 17 (Comparison Example)

A binder consisting of 93.5% by weight of novolac and 6.5% by weight of hexamethylene tetramine was prepared.

EXAMPLE 18 (comparison Example)

A binder consisting of 55% by weight novolac, 36% by weight phenol-resol and 9% by weight of melamine resin was prepared. The phenol-resol was an anhydrous alkaline-condensed phenol-formaldehyde condensation product with a phenol-formaldehyde ratio of 1:2.0 and a melting point of about 98° C. (sintering point) and with a free phenol content of about 1.5%. The melamine resin was a melamine-formaldehyde condensation product with a melamineformaldehyde ratio of 1:2.5 and a melting point of 69° to 72° C.

EXAMPLE 19 (Comparison Example)

A binder consisting of 59% by weight of novolac, 40% by weight of epoxy resin and 1% by weight of MI was prepared. The epoxy resin was a commercial product (Rütapox 0194) on the basis of Bisphenol A with an epoxide equivalent of 900 to 1000 g/equivalent.

EXAMPLE 20

With each of the binders of Examples 6 to 13 and 15 to 19, the following mixtures were produced: 70 parts by weight of reprocessed cotton and 30 parts by weight of binder. Nonwoven textile structures were produced from the mixtures under hot pressing (Examples 6 to 13 and 15 to 19, conditions: 180° C., 3 minutes; Example 14: conditions 170° C., 5 minutes). Strengths and torsion rigidities were compared with one another and particularly with the industrial standard (Example 17).

Rating: +standard
−below standard

Further, three test specimens (90×200 mm) were punched out of each of the nonwoven textile structures and stored for 16 hours at 40° C. in closed 3-liter glass vessels containing 30 ml of water, and thereafter the vessels were opened and evaluated by an olfactory team. The scent was established as a relative evaluation (1=no odor; 2=not molesting, 3=molesting; 4=extremely molesting). The results obtained are shown in Table 2.

TABLE 2

| Example | Nonwoven fabric with binder from | | | | | | |
|---|---|---|---|---|---|---|---|
| | 6 | 7 | 8 | 9 | 10 | 11 | 12 |
| Strength and rigidity | + | + | + | + | + | + | + |
| Scent | 2.0 | 1.9 | 1.8 | 1.7 | 1.8 | 1.9 | 2.0 |
| Example | Nonwoven fabric with binder from | | | | | |
| | 13 | 15 | 16 | 17 | 18 | 19 |
| Strength and rigidity | + | + | + | − | − | |
| Scent | 1.8 | 2.0 | 1.9 | 3.5 | 2.0 | 2.3 |

Various modifications of the products and process of the invention may be made without departing from the spirit or scope thereof and it is to be understood that the invention is intended to be limited only as defined in the appended claims.

What we claim is:

1. A binder mixture consisting essentially of lignin with reactive groups and phenol-novolac in a weight ratio of 95:5 to 50:50 wherein the reactive groups are isocyanate or epoxide groups.

2. A binder mixture of claim 1 with a lignin-phenol novolac weight ratio of 92.5:75 to 75:25.

3. A binder mixture of claim 1 containing additional curing accelerators.

4. A binder mixture of claim 3 wherein the additional curing accelerator is at least one member of the group consisting of imidazoles and polyamines.

5. A wood fiber material containing a binder mixture of claim 1.